(12) United States Patent
Li et al.

(10) Patent No.: US 12,181,348 B1
(45) Date of Patent: Dec. 31, 2024

(54) FLOATING THERMOMETER WITH DISINFECTION DEVICE

(71) Applicant: SHENZHEN COOTWAY TECHNOLOGY CO., LTD., Shenzhen (CN)

(72) Inventors: Daiquan Li, Shenzhen (CN); Ming Li, Shenzhen (CN); Benqiang Yin, Shenzhen (CN)

(*) Notice: Subject to any disclaimer, the term of this patent is extended or adjusted under 35 U.S.C. 154(b) by 0 days.

(21) Appl. No.: 18/423,680

(22) Filed: Jan. 26, 2024

(30) Foreign Application Priority Data

Jan. 22, 2024 (CN) .......................... 202410086681.1

(51) Int. Cl.
| | |
|---|---|
| *G01K 1/14* | (2021.01) |
| *C02F 1/50* | (2023.01) |
| *G01K 1/02* | (2021.01) |
| *C02F 103/42* | (2006.01) |

(52) U.S. Cl.
CPC ................. *G01K 1/14* (2013.01); *C02F 1/50* (2013.01); *G01K 1/02* (2013.01); *C02F 2103/42* (2013.01); *C02F 2209/02* (2013.01); *C02F 2303/04* (2013.01); *G01K 2215/00* (2013.01)

(58) Field of Classification Search
CPC ........ G01K 1/14; G01K 1/02; G01K 2215/00; C02F 1/50; C02F 2103/42; C02F 2209/02
See application file for complete search history.

(56) References Cited

U.S. PATENT DOCUMENTS

| 1,496,784 A | * | 6/1924 | Norwood | .................. | G01K 1/14 |
| | | | | | 374/E1.018 |
| 1,883,554 A | * | 10/1932 | Chapman | ................. | G01K 5/62 |
| | | | | | 374/E5.037 |
| 4,503,563 A | * | 3/1985 | Johnson | ..................... | F21S 9/02 |
| | | | | | 362/267 |

(Continued)

FOREIGN PATENT DOCUMENTS

| CN | 101690649 A | * | 4/2010 |
| CN | 201575869 U | * | 9/2010 |

(Continued)

OTHER PUBLICATIONS

18423680_2024-03-13_CN_109908384_A_H.pdf,2019-06-21.*

(Continued)

*Primary Examiner* — Gail Kaplan Verbitsky

(57) ABSTRACT

A floating thermometer with a disinfection device includes a shell, a temperature sensing device and a display device. An upper part of the shell is provided with a sealed first accommodating chamber, first accommodating chamber is arranged with a control device. A lower part of the shell is provided with a second accommodating chamber and a first through hole connected to the second accommodating chamber. The temperature sensing device is located on surface of the shell and electrically connected to the control device. The temperature sensing device is configured to be immersed in water to detect water temperature, generate an electrical signal, and transmit the electrical signal to the control device. The display device is located on upper surface of the shell and electrically connected to the control device. The control device receives the electrical signal and controls the display device to show temperature.

18 Claims, 11 Drawing Sheets

(56) References Cited

U.S. PATENT DOCUMENTS

| | | | | |
|---|---|---|---|---|
| 5,152,610 A | * | 10/1992 | Hallett | E04H 4/14 |
| | | | | 374/208 |
| 5,169,236 A | * | 12/1992 | Iest | G01K 13/00 |
| | | | | 374/E1.008 |
| 11,499,875 B2 | * | 11/2022 | Guo | G01K 13/026 |
| 2005/0220169 A1 | * | 10/2005 | McGowan-Scanlon | |
| | | | | G01K 1/14 |
| | | | | 374/E1.018 |
| 2010/0232145 A1 | * | 9/2010 | Liu | F21V 19/04 |
| | | | | 362/157 |
| 2015/0323389 A1 | * | 11/2015 | Dayan | G01K 13/00 |
| | | | | 374/156 |
| 2022/0136907 A1 | * | 5/2022 | Pike | G01K 1/08 |
| | | | | 374/100 |
| 2023/0184598 A1 | * | 6/2023 | Zhang | G01K 13/026 |
| | | | | 374/208 |

FOREIGN PATENT DOCUMENTS

| | | | | |
|---|---|---|---|---|
| CN | 218465573 U | * | 2/2023 | |
| EP | 1323872 A1 | * | 7/2003 | E03C 1/0409 |
| KR | 20170001281 U | * | 4/2017 | |

OTHER PUBLICATIONS

18423680_2024-03-13_CN_218465573_U_H.pdf,2023-02-10.*
18423680_2024-03-13_EP_1323872_A1_H.pdf,2003-07-02.*
18423680_2024-03-14_CN_101690649_A_H.pdf,2010-04-07.*
18423680_2024-09-18_CN_201575869_U_H.pdf,2010-09-08.*
18423680_2024-09-18_KR_20170001281_U_H.pdf,2017-04-13.*

* cited by examiner

FLOATING THERMOMETER WITH DISINFECTION DEVICE

CROSS-REFERENCE TO RELATED APPLICATIONS

The application claims priority of Chinese patent application CN2024100866811, filed on Jan. 22, 2024, which is incorporated herein by reference in its entireties.

TECHNICAL FIELD

The present disclosure relates to the technical field of temperature measuring devices, particularly to a floating thermometer with a disinfection device.

BACKGROUND

Swimming pools are places where people engage in swimming activities or competitions. Among them, constant temperature swimming pools are especially popular. To monitor water temperature of pools, people commonly use thermometers.

For ensuring the cleanliness of pool water, it's often necessary to disinfect pools. Existing pool thermometers usually float on water surface but do not have disinfection capabilities. People need to set up separate pool disinfection devices or regularly use disinfection equipment to sterilize the water. Additionally, due to their small size, it is difficult for staff to locate floating pool thermometers.

To address these issues, present disclosure provides a floating thermometer arranged with a disinfection device. It offers a simple structure capable of both measuring water temperature and disinfecting the water in the pool simultaneously.

SUMMARY

In order to overcome the shortcomings of the prior art, the present disclosure provides a floating thermometer with a disinfection device, which offers a simple structure capable of both measuring water temperature and disinfecting the water in the pool simultaneously.

The technical solution adopted by the present disclosure to solve the technical problem is as follows: a floating thermometer with a disinfection device including a shell, a temperature sensing device, and a display device. An upper part of the shell is provided with a sealed first accommodating chamber, first accommodating chamber is arranged with a control device. A lower part of the shell is provided with a second accommodating chamber and a first through hole connected to the second accommodating chamber. The shell is configured to float on water surface. The second accommodating chamber is configured to accommodate disinfectant substance and to be immersed in water. The first through hole allows water to pass through. The temperature sensing device is located on surface of the shell and electrically connected to the control device. The temperature sensing device is configured to be immersed in water to detect water temperature, generate an electrical signal, and transmit the electrical signal to the control device. The display device is located on upper surface of the shell and electrically connected to the control device. The control device receives the electrical signal and controls the display device to show temperature.

As the improvement of the present disclosure, the shell is provided with an insertion hole and a connection hole. The connection hole connects the first accommodating chamber and the insertion hole. The temperature sensing device is inserted into the insertion hole. The connection hole is used for passage of a power connection line.

As the improvement of the present disclosure, an outer surface of the shell near the insertion hole is provided with an accommodating groove, and at least part of the temperature sensing device extends into the accommodating groove.

As the improvement of the present disclosure, the floating thermometer with a disinfection device further includes an illumination device, wherein the illumination device is located within the first accommodating chamber and electrically connected to the control device. At least part of the shell is transparent or semi-transparent. The illumination device produces light that passes through the shell.

As the improvement of the present disclosure, the floating thermometer with a disinfection device further includes a lampshade, which is located within the first accommodating chamber and arranged around the illumination device. A surface of the lampshade is provided with a projection pattern.

As the improvement of the present disclosure, the shell includes a floating shell and a supporting shell. The first accommodating chamber is located at an upper part of the floating shell, and a lower part of the floating shell is provided with a connecting part. The supporting shell is connected to the connecting part, and the second accommodating chamber is formed between the supporting shell and the connecting part.

As the improvement of the present disclosure, a lower part of an inner surface of the connecting part is provided with a first abutting block, and an upper part of an outer surface of the supporting shell is provided with a second abutting block. The first abutting block abuts against the second abutting block.

As the improvement of the present disclosure, an upper part of the inner surface of the connecting part is provided with a first slider. A sliding hole is formed on the second abutting block, and the first slider is slidably arranged in the sliding hole, therefore the supporting shell can slide relative to the connecting part.

As the improvement of the present disclosure, the floating thermometer with a disinfection device further includes a rotating shell. The rotating shell is provided with a first opening, and the connecting part is provided with a second opening. The rotating shell is rotatably fitted over the connecting part and rotate between an open position and a closed position. In the open position, the first opening corresponds to the second opening; in the closed position, the first opening is offset from the second opening, and the rotating shell covers the second opening.

As the improvement of the present disclosure, an outer surface of the rotating shell is provided with a first friction pattern.

As the improvement of the present disclosure, the floating thermometer with a disinfection device further includes an adjustment shell. The adjustment shell is provided with an adjustment hole and is rotatably mounted on the supporting shell. It rotates between the open position and the closed position. In the open position, the adjustment hole corresponds to the first through hole; in the closed position, the adjustment hole and the first through hole are misaligned, and the adjustment shell covers the first through hole.

As the improvement of the present disclosure, an outer surface of the adjustment shell is provided with a second friction pattern.

As the improvement of the present disclosure, a bottom of the supporting shell is provided with a second through hole, which is connected to the second accommodating chamber.

As the improvement of the present disclosure, the bottom of the supporting shell is additionally provided with an arc-shaped rotation slot. The adjustment shell is arranged with a second slider, which is slidably arranged in the rotation slot.

As the improvement of the present disclosure, a free end of the second slider is provided with a limit block, which abuts against an inner wall of the supporting shell.

As the improvement of the present disclosure, the floating shell includes an upper floating shell and a lower floating shell. The upper floating shell is connected to and covers the lower floating shell. The upper floating shell and the lower floating shell together form the first accommodating chamber.

As the improvement of the present disclosure, the floating thermometer with a disinfection device further includes a sealing ring. The upper floating shell is provided with a sealing groove, and the sealing ring is arranged in the sealing groove. The lower floating shell is inserted along the sealing groove and abuts against the sealing ring.

As the improvement of the present disclosure, the floating thermometer with a disinfection device further includes a battery. The battery is located in the first accommodating chamber and electrically connected to the control device.

As the improvement of the present disclosure, the floating thermometer with a disinfection device further includes a solar panel. The solar panel is arranged on a side of the first accommodating chamber near the upper surface of the shell, and electrically connected to the control device and the battery. The part of the shell corresponding to the solar panel is transparent.

As the improvement of the present disclosure, the floating thermometer with a disinfection device further includes a button. The upper floating shell is provided with a button hole, and the button passes through the button hole and is connected to the control device.

Beneficial effects of the present disclosure are as follows: with the above structure, when in use, as the shell is arranged with the sealed first accommodating chamber, at least part of the shell floats on water surface due to buoyancy. The temperature sensing device immersed in water, effectively measures water temperature and transmits the signal to the control device. The control device receives the electrical signal and controls the display device to show temperature. And the display device is located on the upper surface of the shell, allows users to directly observe temperature. Meanwhile, the second accommodating chamber accommodates disinfectant substances. The disinfectant substances, being immersed in water and disinfect water. And the first through hole allows water to pass through, enabling spread of the disinfectant with water flow. The disinfectant substance includes calcium hypochlorite and other chlorides, which effectively provide chlorine ions for disinfecting water in swimming pools and similar places.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
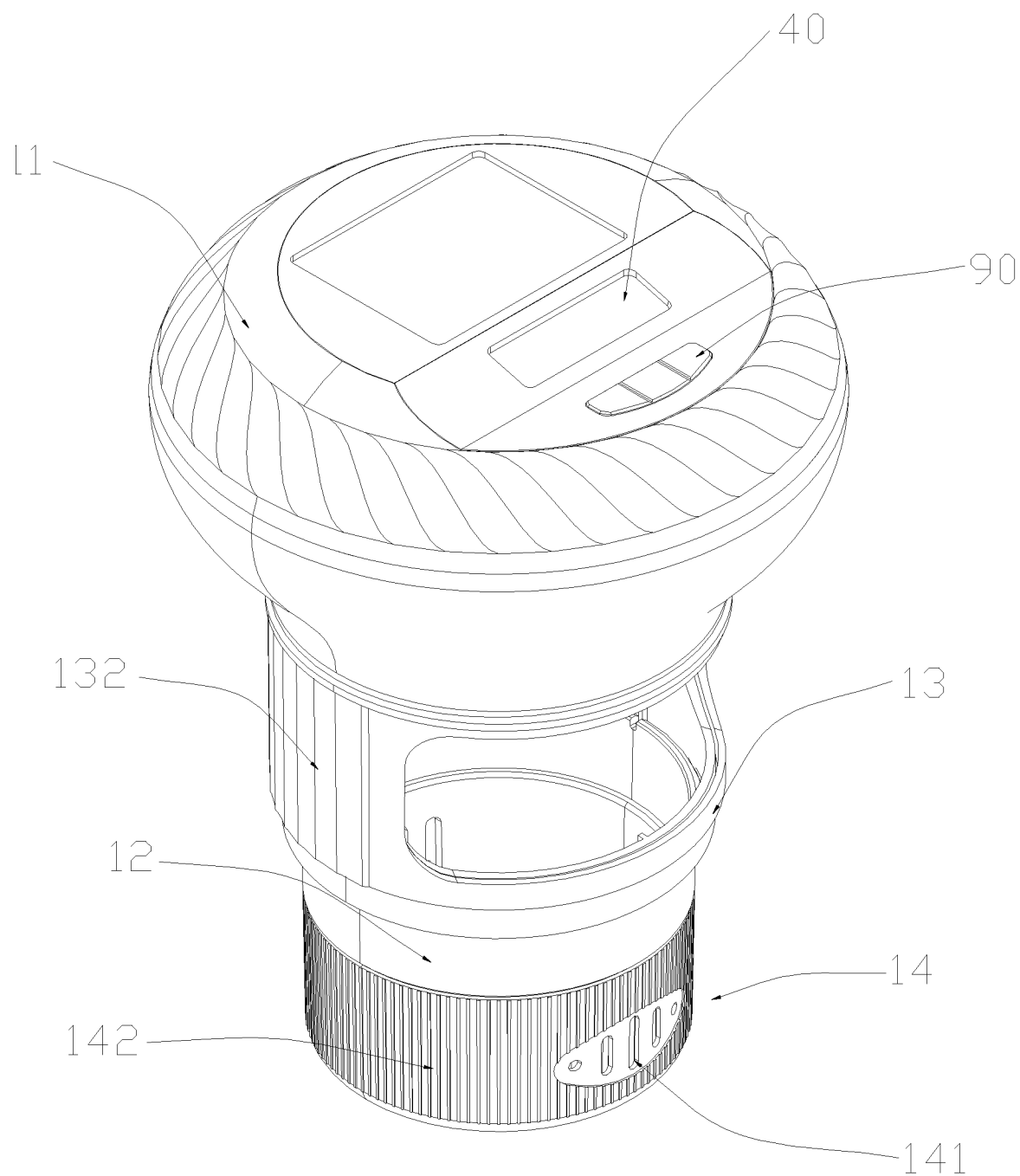
FIG. 1 is a schematic view of an overall structure of the present disclosure from one perspective.
Figure 2:
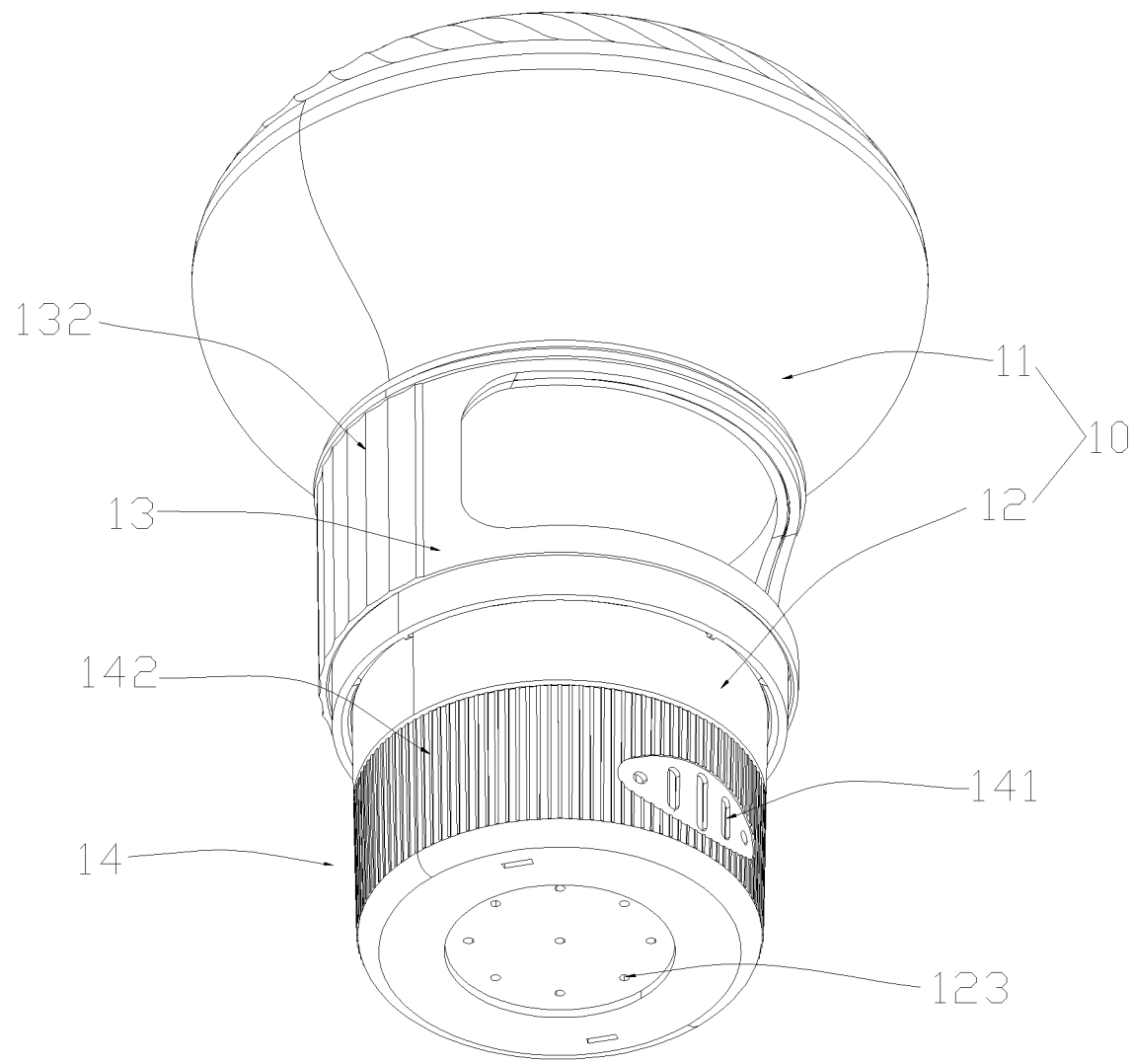
FIG. 2 is a schematic view of the overall structure of the present disclosure from another perspective.
Figure 3:
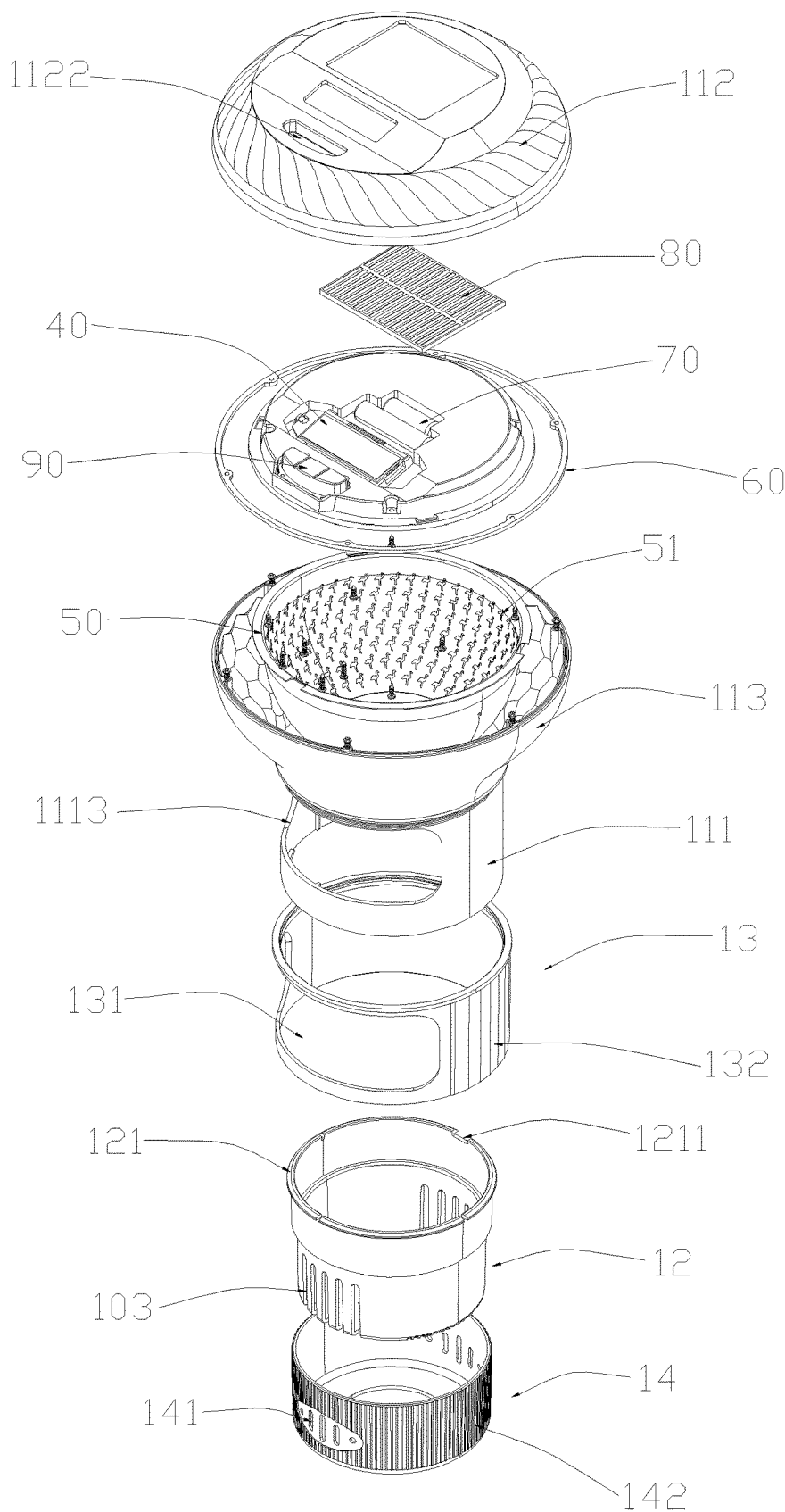
FIG. 3 is an exploded view of the present disclosure from one perspective.
Figure 4:
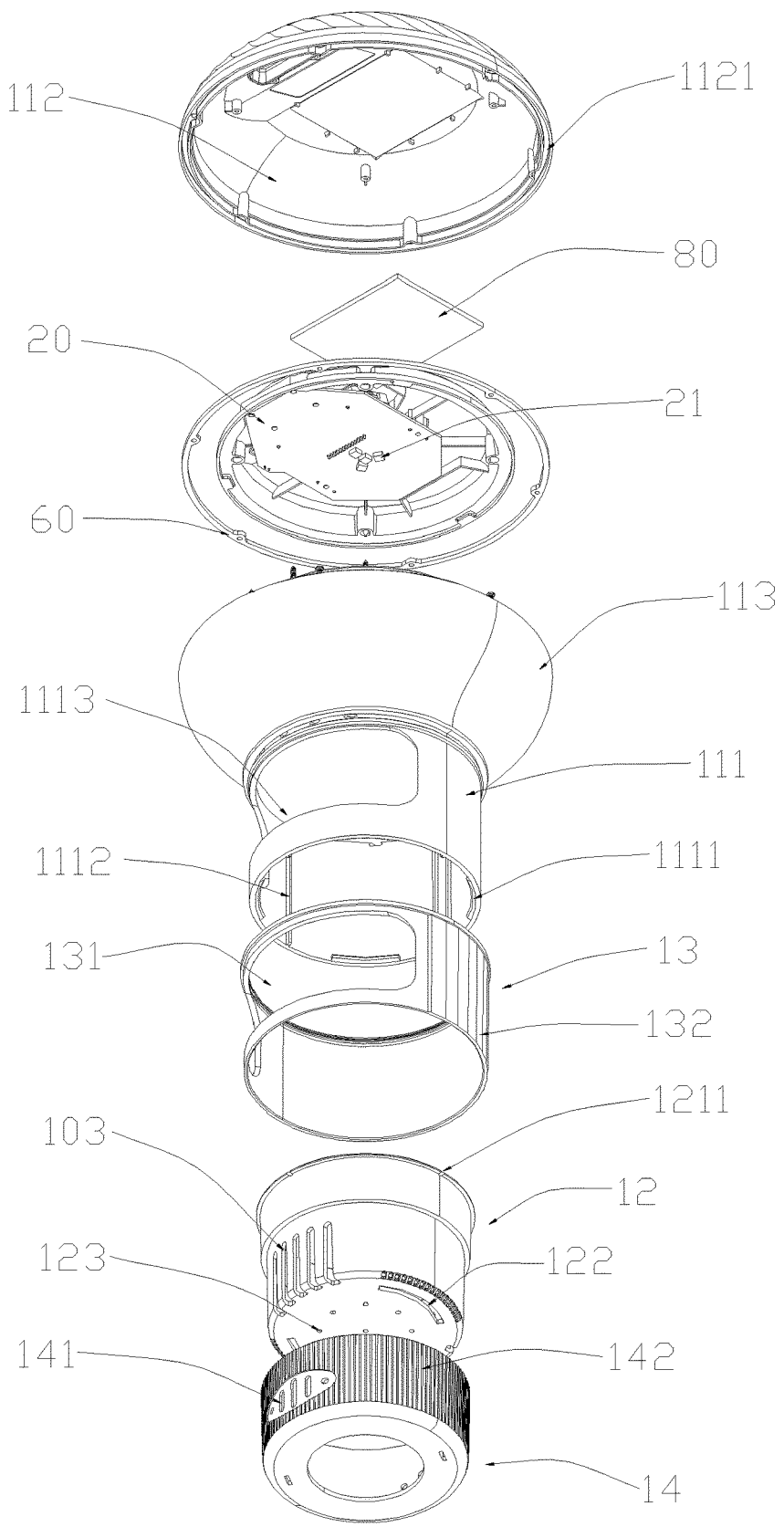
FIG. 4 is an exploded view of the present disclosure from another perspective.
Figure 5:
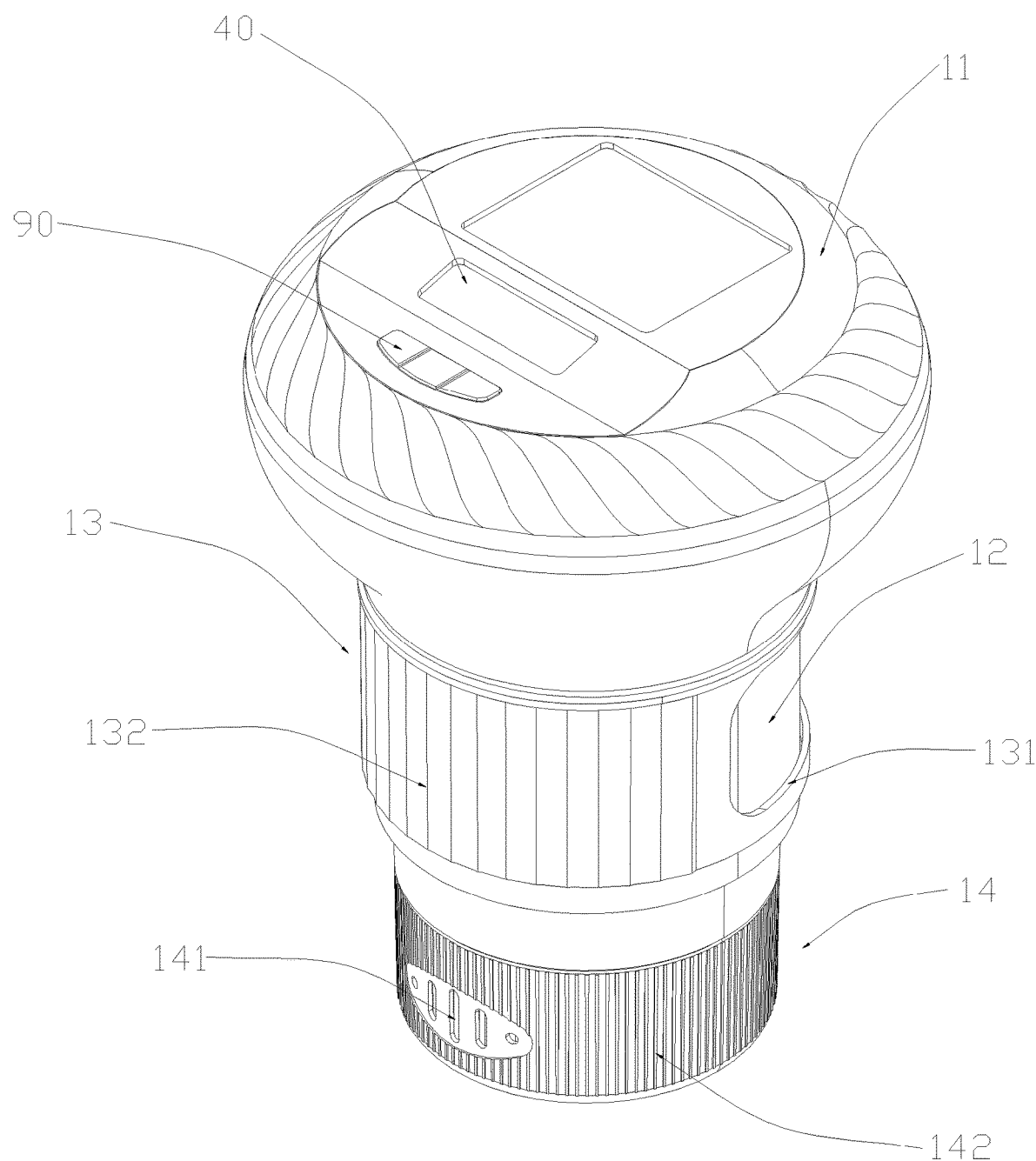
FIG. 5 is a schematic view of the overall structure of the present disclosure with a rotating shell in a closed position and an adjustment shell in an open position.
Figure 6:
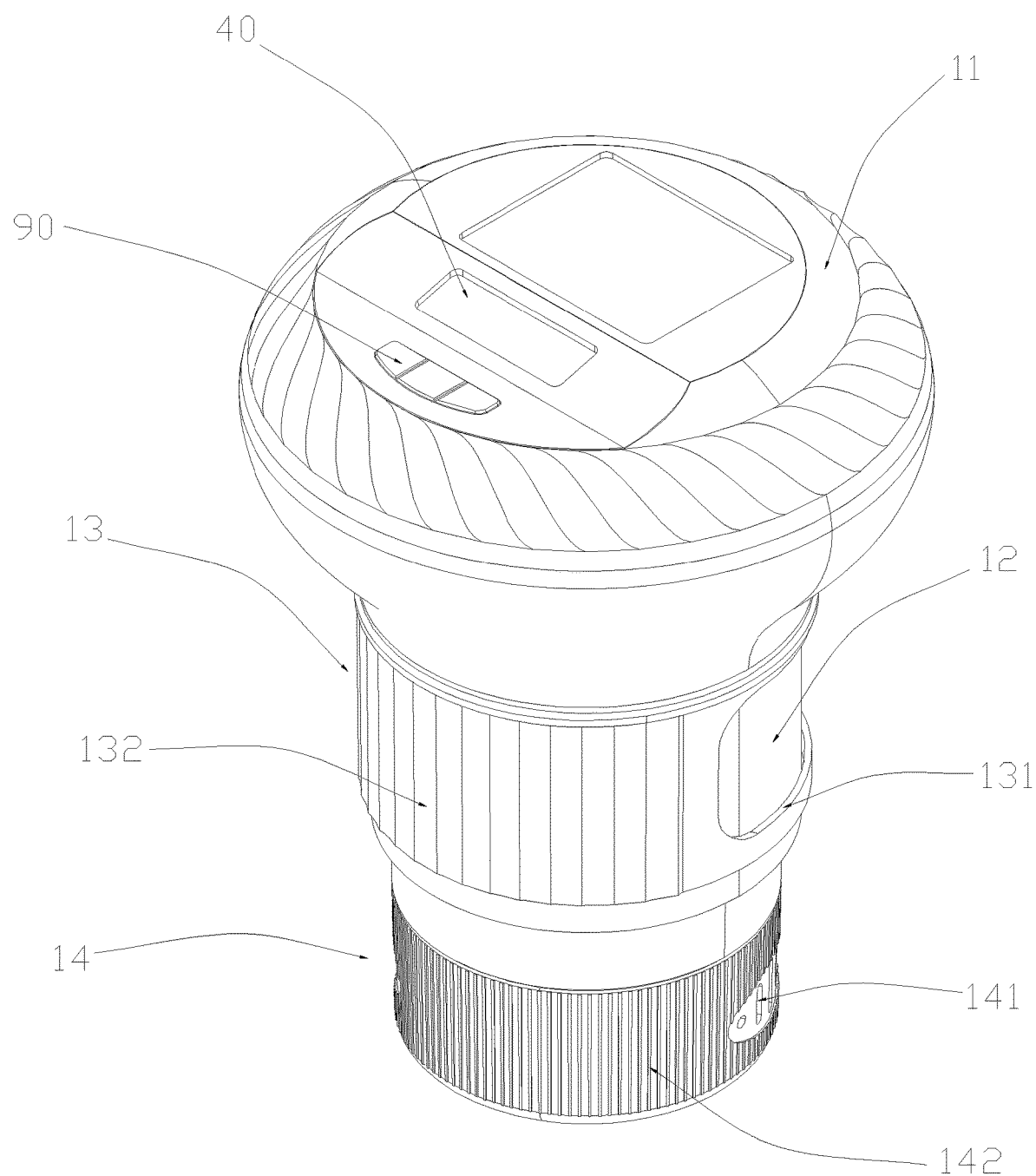
FIG. 6 is a schematic view of the overall structure of the present disclosure with both the rotating shell and the adjustment shell in the closed position.
Figure 7:
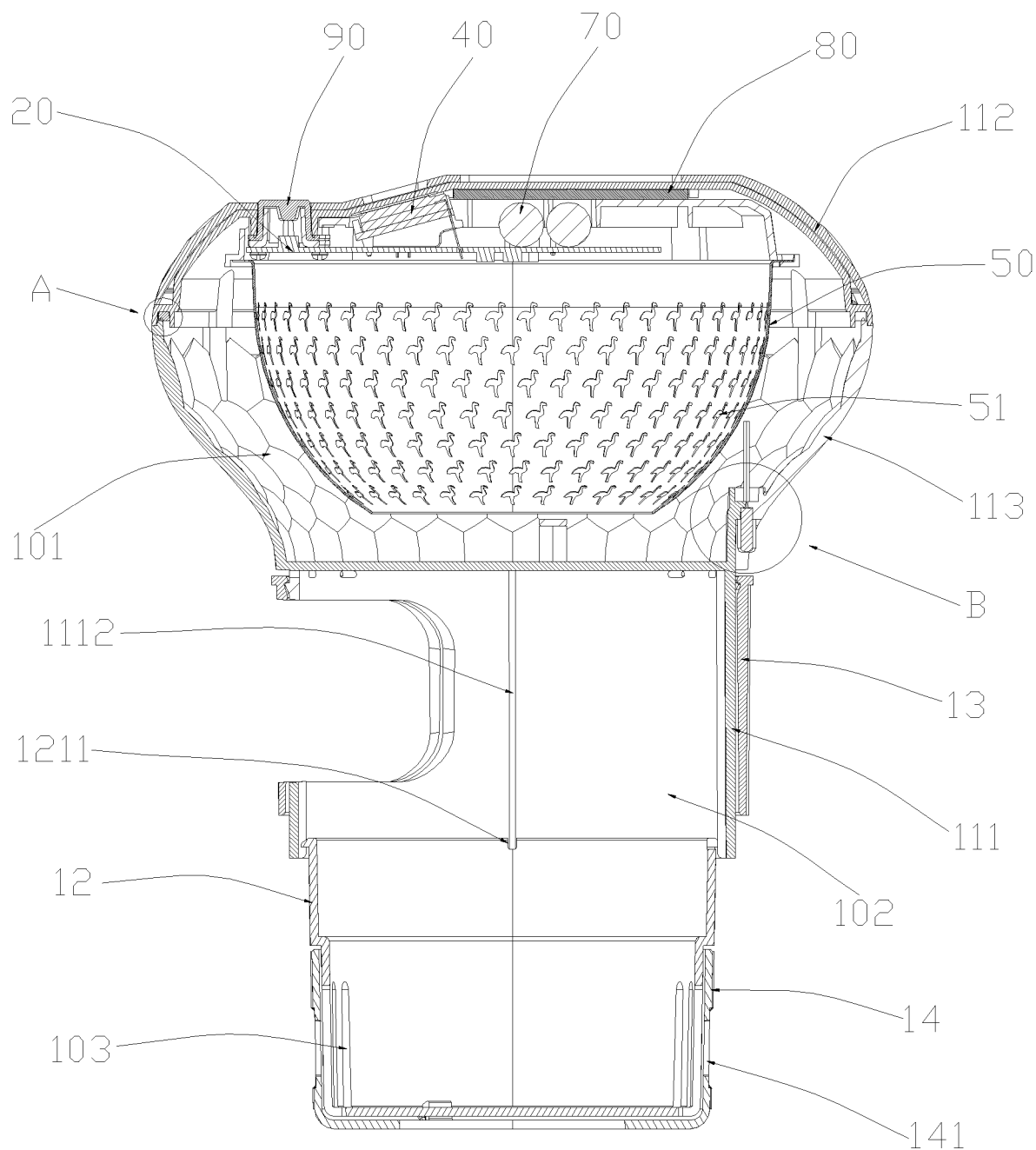
FIG. 7 is a sectional schematic view of the present disclosure with both the rotating shell and the adjustment shell in the open position.
Figure 8:
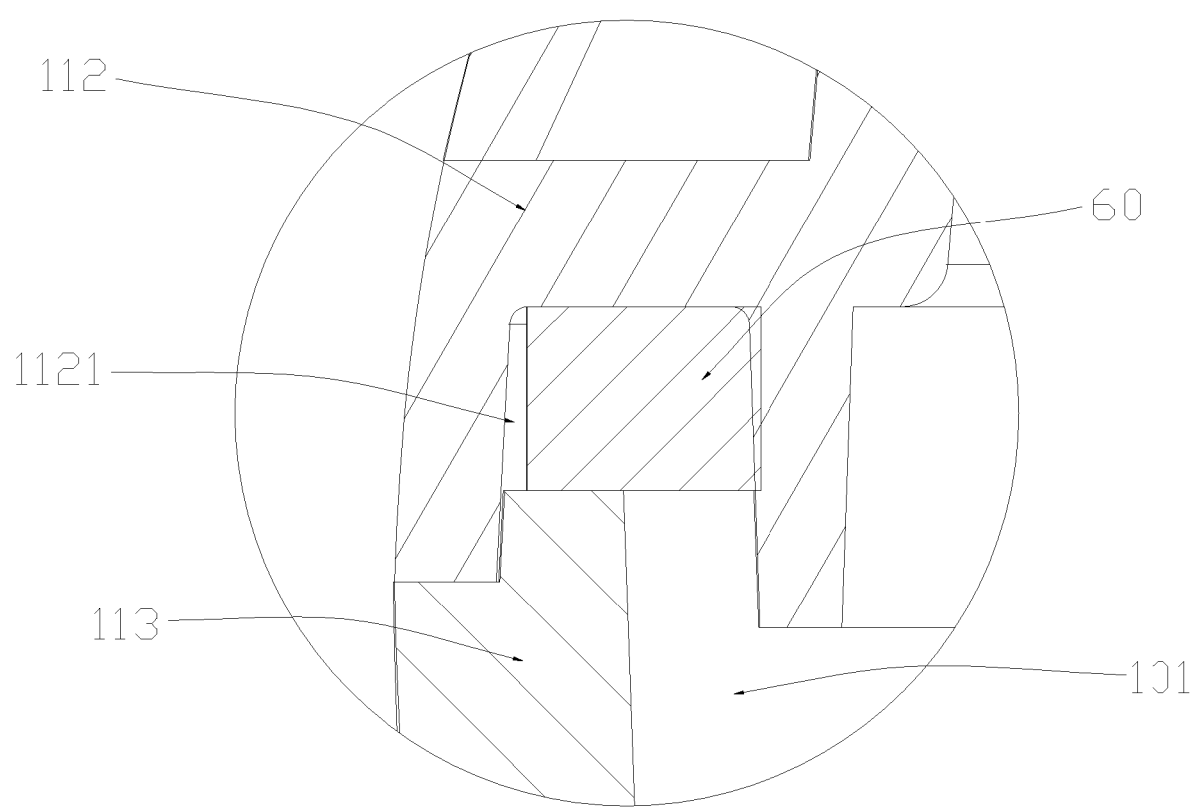
FIG. 8 is an enlarged view of circle A in FIG. 7.
Figure 9:
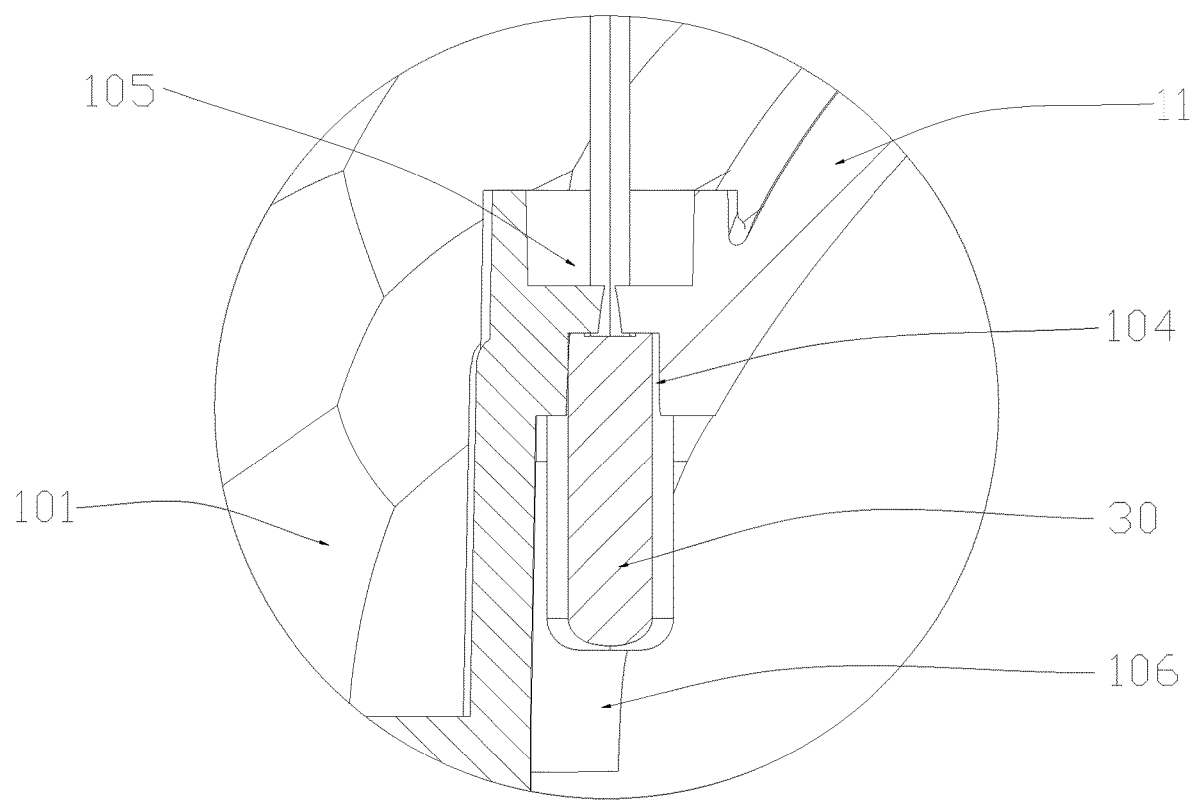
FIG. 9 is an enlarged view of circle B in FIG. 7.
Figure 10:
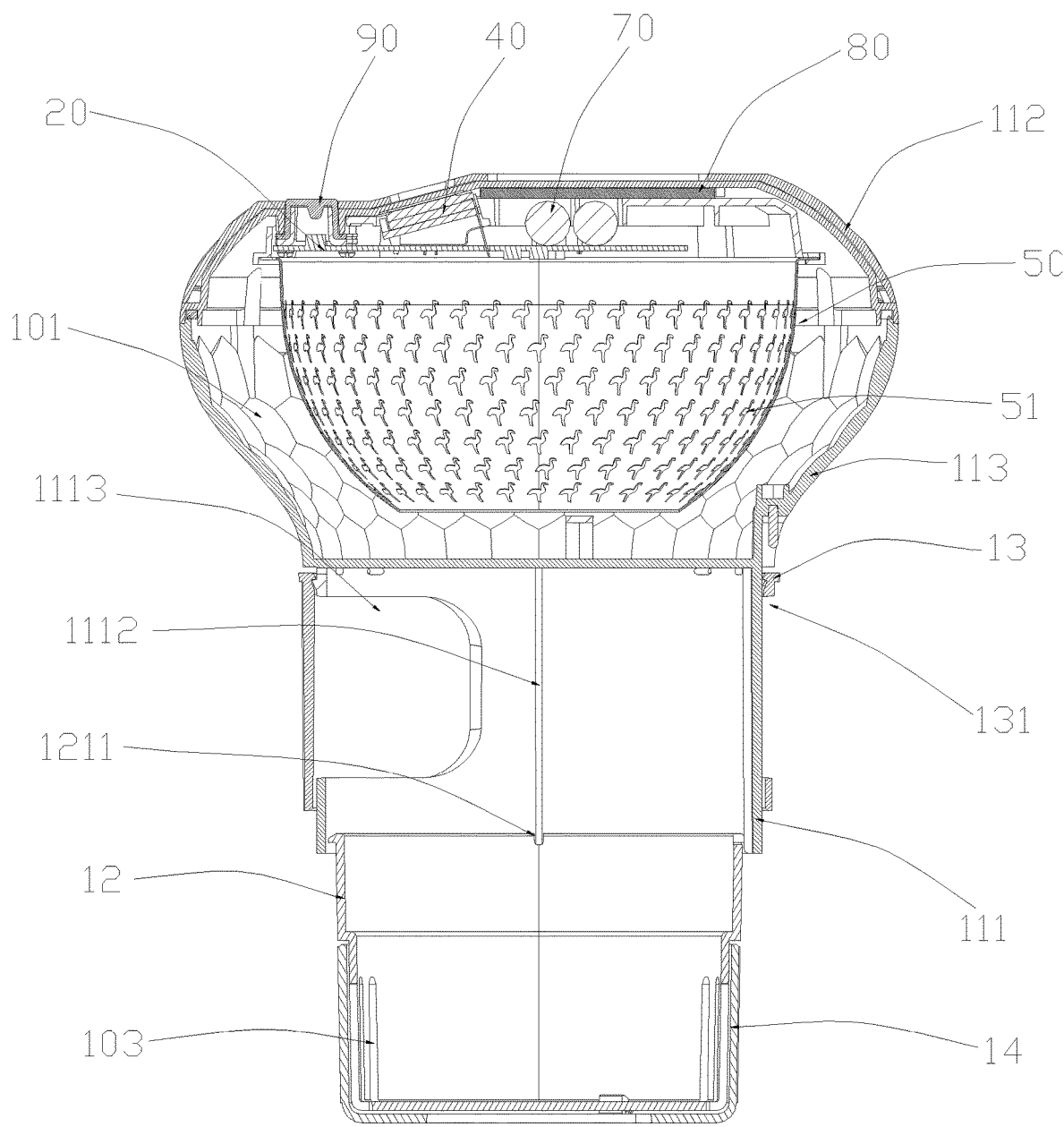
FIG. 10 is a sectional schematic view of the present disclosure with both the rotating shell and the adjustment shell in the closed position.
Figure 11:
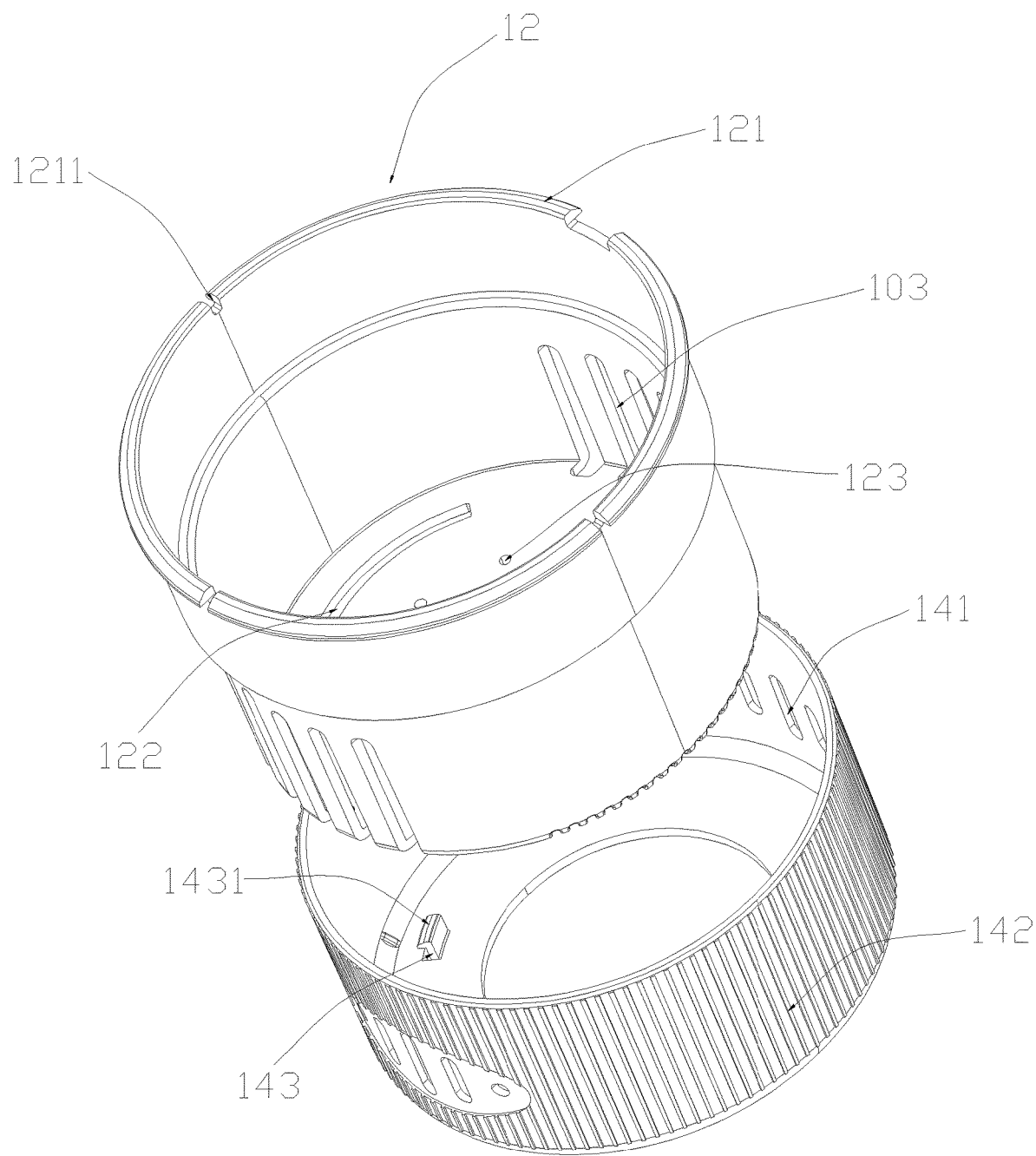
FIG. 11 is a partial exploded view of the present disclosure.

Referring to FIG. 1 to FIG. 11, a floating thermometer with a disinfection device includes a shell 10, a temperature sensing device 30 and a display device 40, An upper part of the shell 10 is arranged with a sealed first accommodating chamber 101, which accommodates a control device 20. A lower part of the shell 10 is provided with a second accommodating chamber 102 and a first through hole 103 connected to the second accommodating chamber 102. The shell 10 is configured to float on water surface. The second accommodating chamber 102 is used to accommodate disinfectant substance and to be immersed in water, while the first through hole 103 allows water to pass through.

The temperature sensing device 30 is located on a surface of the shell 10 and electrically connected to the control device 20. The temperature sensing device 30 is configured to be immersed in water to detect water temperature, generate an electrical signal, and transmit the signal to the control device 20.

The display device 40 is located on an upper surface of the shell 10 and electrically connected to the control device 20. The control device 20 receives the electrical signal and controls the display device 40 to show temperature.

With the above structure, when in use, as the shell 10 is arranged with the sealed first accommodating chamber 101, at least part of the shell 10 floats on water surface due to buoyancy. And the temperature sensing device 30 immersed in water, effectively measures water temperature and transmits the signal to the control device 20. The control device 20 receives the electrical signal and controls the display device 40 to show temperature. And the display device 40 is located on the upper surface of the shell 10, allows users to directly observe temperature. Meanwhile, the second accommodating chamber 102 accommodates disinfectant substances. The disinfectant substances, being immersed in water and disinfect water. And the first through hole 103 allows water to pass through, enabling spread of the disinfectant with water flow. The disinfectant substance includes calcium hypochlorite and other chlorides, which effectively provide chlorine ions for disinfecting water in swimming pools and similar places.

In this embodiment, the shell 10 is provided with an insertion hole 104 and a connection hole 105. The connection hole 105 connects the first accommodating chamber 101 and the insertion hole 104. The temperature sensing device 30 is inserted into the insertion hole 104, and the connection hole 105 is designed for passage of power connection lines. With the above structure, the insertion hole 104 allows for insertion and use of the temperature sensing device 30 and implements installation of the temperature sensing device 30 effectively. Moreover, the connection hole 105 allows for passage of power connection lines, achieving electrical connectivity between the temperature sensing device 30 and the control device 20. Preferably, the temperature sensing device 30 is tightly fitted into the insertion hole 104, effectively ensuring the sealing of the first accommodating chamber 101, thus enabling the shell 10 to float on water surface.

In this embodiment, an outer surface of the shell 10 near the insertion hole 104 is provided with an accommodating groove 106, and at least a part of the temperature sensing device 30 extends into the accommodating groove 106. With the above structure, when in use, the accommodating groove 106 is connected to exterior and submerged in water in the shell 10, then water directly enter into the accommodating groove 106, and the temperature sensing device 30 extends into the accommodating groove 106 to increase contact area between water and the temperature sensing device 30, enabling the temperature sensing device 30 to be more accurate, faster and efficient to detect water temperature, thus improving accuracy of temperature measurement of the product.

In this embodiment, the floating thermometer further includes an illumination device 21, the illumination device 21 is located within the first accommodating chamber 101 and electrically connected to the control device 20. At least a part of the shell 10 is transparent or semi-transparent, and light produced by the illumination device 21 pass through the shell 10. With the above structure, the illumination device 21 produces light, and provides illumination and decoration for the product through the transparent or semi-transparent shell, therefore users can easily locate the product in places like swimming pools and visually observe temperature displayed on screen at night or in low-light conditions. Additionally, the light also projects various types of light and creates a variety of lighting effects. Preferably, the transparent or semi-transparent shell surface have different cut surfaces to refract the light, creating diverse lighting effects. Preferably, the illumination device 21 is located at a bottom of the control device 20, casting its light through sides of the shell and angling downwards, ultimately illuminating water surface. The light, after reflecting off the water surface, creates a more beautiful lighting effect.

In this embodiment, the floating thermometer also includes a lampshade 50, which is arranged within the first accommodating chamber 101 and surrounds the illumination device 21. A surface of the lampshade 50 is provided with a projection pattern 51. With the above structure, the lampshade 50 surrounding the illumination device 21 effectively protects the illumination device 21 and helps to project the light evenly in all directions. Moreover, the projection pattern 51 on the surface of the lampshade 50 creates better lighting effects, enhancing an aesthetic appeal of the product. Additionally, if users wish to change the lighting effect, they can simply replace the lampshade 50, allowing for a quick and convenient change in lighting effects.

In this embodiment, the shell 10 includes a floating shell 11 and a supporting shell 12. The first accommodating chamber 101 is located in an upper part of the floating shell 11, and a lower part of the floating shell 11 is provided with a connecting part 111. The supporting shell 12 is connected to the connecting part 111, and the second accommodating chamber 102 is formed by the supporting shell 12 and the connecting part 111. With the above structure, when in use, the connecting part 111 allows for attachment of the supporting shell 12, facilitating user assembly of the product and improving production efficiency.

In this embodiment, an inner surface of a lower part of the connecting part 111 is provided with a first abutting block 1111, and an upper outer surface of the supporting shell 12 is provided with a second abutting block 121. The first abutting block 1111 abuts against the second abutting block 121. With the above structure, when ins use, the first abutting block 1111 abuts against the second abutting block 121, enabling a stable connection between the connecting part 111 and the supporting shell 12, thus preventing disconnecting of the connecting part 111 from the supporting shell 12, ensuring the product's stability.

In this embodiment, an inner surface of the connecting part 111 is arranged with a first slider 1112, and the second abutting block 121 on the supporting shell 12 is provided with a sliding hole 1211. The first slider 1112 is slidably arranged within the sliding hole 1211, allowing the supporting shell 12 to slide relative to the connecting part 111. With the above structure, when in use, the supporting shell 12 slides up and down relative to the connecting part 111, altering the volume of the second accommodating chamber 102. As it slides, the first slider 1112 moves within the sliding hole 1211, effectively limiting the circumferential relative movement between the supporting shell 12 and the connecting part 111, thereby enhancing the stability of the product.

In this embodiment, the floating thermometer further includes a rotating shell 13. The rotating shell 13 is provided with a first opening 131, and the connecting part 111 is arranged with a second opening 1113. The rotating shell 13 is rotatably fitted over the connecting part 111 and rotate between an open position and a closed position. In the open position, the first opening 131 corresponds to the second opening 1113. In the closed position, the first opening 131 is offset from the second opening 1113, and the rotating shell 13 covers the second opening 1113. With the above structure, when in use, users can rotate the rotating shell 13, thereby adjusting relative positions of the first opening 131 and the second opening 1113. Specifically, when the rotating shell 13 is turned to the open position, the first opening 131 aligns with the second opening 1113, allowing users to insert disinfectant into the second accommodating chamber 102 through the first opening 131 and the second opening 1113, facilitating the placement and replacement of the disinfectant. Conversely, when the rotating shell 13 is turned to the closed position, the first opening 131 and the second opening 1113 are misaligned, and the rotating shell 13 covers the second opening 1113, and the connecting part 111 covers the first opening 131, thereby effectively preventing escape of disinfectant from the first opening 131 and the second opening 1113, ensuring the stability of the product.

In this embodiment, an outer surface of the rotating shell 13 is provided with a first friction pattern 132. With the above structure, when is use, users grasp the rotating shell 13 to facilitate rotation of the rotating shell 13 relative to the connecting part 111. Meanwhile, the first friction pattern 132 increases the friction coefficient of the product's surface, making it easier for users to rotate the rotating shell 13, thereby enhancing user convenience.

In this embodiment, the device also includes an adjustment shell 14, the adjustment shell 14 is provided with an adjustment hole 141. The adjustment shell 14 is rotatably fitted over the supporting shell 12 and rotate between the open position and the closed position. In the open position, the adjustment hole 141 corresponds to the first through hole 103; in the closed position, the adjustment hole 141 is offset from the first through hole 103, and the adjustment shell 14 covers the first through hole 103. With the above structure, when in use, rotating the adjustment shell 14 to the open position and aligns the adjustment hole 141 with the first through hole 103, allowing water to effectively pass through the adjustment hole 141 with the first through hole 103 and contact the disinfectant in the second accommodating chamber 102, increasing dispersion rate of the disinfectant. Conversely, when rotating the adjustment shell 14 to the closed position, the adjustment hole 141 is offset from the first through hole 103, and the adjustment shell 14 covers the first through hole 103, reducing dispersion rate of the disinfectant. By rotating the adjustment shell 14, users can adjust dispersion rate of the disinfectant, allowing the product to continuously and steadily disinfect places such as swimming pools.

In this embodiment, an outer surface of the adjustment shell 14 is provided with a second friction pattern 142. With the above structure, the second friction pattern 142 increases the friction coefficient of the outer surface of the adjustment shell 14, making it easier for users to rotate shell 14 and enhancing user convenience.

In this embodiment, a bottom of the supporting shell 12 in this embodiment is provided with a second through hole 123, the second through hole 123 connects to the second accommodating chamber 102. With the above structure, the bottom of the supporting shell 12 arranged with the second through hole 123 enables the passage of water and disinfectant, allowing for continuous dispersion of the disinfectant, ensuring the product's disinfection effectiveness. Preferably, the chloride-based disinfectant slowly dissolve in water and pass through the second through hole 123, dispersing into external water. This effectively cleans and purifies the water in swimming pools and similar locations, providing a more durable usage.

In this embodiment, the bottom of the supporting shell 12 is further provided with an arc-shaped rotation slot 122, and the adjustment shell 14 is provided with a second slider 143. The second slider 143 is slidably arranged in the rotation slot 122. With the above structure, the arc-shaped rotation slot 122 works in conjunction with the second slider 143, ensuring a stable connection between the adjustment shell 14 and the supporting shell 12, and enabling stable rotational movement around an axis.

In this embodiment, a free end of the second slider 143 is arranged with a limit block 1431, the limit block abuts against an inner wall of the supporting shell 12. With the above structure, the limit block 1431 restricts the movement of the second slider 143 within the rotation slot 122, preventing the second slider 143 from detaching from the rotation slot 122, thus enhancing the stability of the product. Meanwhile, also limits an axial relative movement between the supporting shell 12 and the adjustment shell 14, further ensuring the product's stability.

In this embodiment, the floating shell 11 includes an upper floating shell 112 and a lower floating shell 113. The upper floating shell 112 is connected to and covers the lower floating shell 113, between the upper floating shell 112 and the lower floating shell 113 forming the first accommodating chamber 101. With the above structure, the separately configured upper floating shell 112 and the lower floating shell 113 is allowed to be manufactured independently and then assembled into a single unit, thereby enhancing the production efficiency of the product. Furthermore, it facilitates the placement of components such as the control device 20 within the first accommodating chamber 101, making assembly more convenient.

In this embodiment, the floating thermometer also includes a sealing ring 60. The upper floating shell 112 is arranged with a sealing groove 1121, and the sealing ring 60 is arranged within the sealing groove 1121. The lower floating shell 113 is inserted along the sealing groove 1121 and abuts against the sealing ring 60. With the above structure, the sealing ring 60 is arranged in the sealing groove 1121. The lower floating shell 113 abutting against the sealing ring 60, restricting the sealing ring 60 within the sealing groove 1121, thus effectively limits movement of the sealing ring 60, enhancing the sealing between the upper floating shell 112 and the lower floating shell 113, protecting components within the first accommodating chamber 101 and maintains the product's stable buoyancy, ensuring it floats steadily on the water surface.

In this embodiment, the floating thermometer also includes a battery 70, the battery 70 is located in the first accommodating chamber 101 and electrically connected to the control device 20. With the above structure, the battery 70 power components such as the control device 20 and the illumination device 21 and other components, effectively extending the product's operational duration, enabling the product to continuously measure water temperature, providing convenience to the user.

In this embodiment, the floating thermometer also includes a solar panel 80. The solar panel 80 is located on a side of the first accommodating chamber 101, near the upper surface of the shell 10, and is electrically connected to the control device 20 and the battery 70. A part of the shell 10 corresponding to the solar panel 80 is transparent. With the above structure, when in use, the solar panel 80 convert solar energy into electrical energy, powering components such as the control device 20 and other components meanwhile storing electrical energy in the battery 70, further enhancing the product's battery life. Moreover, the transparency of the part of the shell 10 corresponding to the solar panel 80 allows sunlight to pass through, improving energy utilization efficiency.

In this embodiment, the floating thermometer also includes a button 90. The upper floating shell 112 is arranged with a button hole 1122, and the button 90 is connected to the control device 20 through the button hole 1122. With the above structure, users can achieve human-machine interaction by pressing the button 90. Specifically, pressing the button 90 to turn the illumination device 21 on or off, or adjust lighting mode of the illumination device 21, enhancing the product's illumination intensity or changing its lighting effects.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A floating thermometer with a disinfection device, comprising:
   a shell, wherein an upper part of the shell is provided with a sealed first accommodating chamber, a control device is disposed in the first accommodating chamber, a lower part of the shell is provided with a second accommodating chamber and a first through hole connected to the second accommodating chamber, the shell is configured to float on water surface, the second accommodating chamber is configured to accommodate disinfectant substance and to be immersed in water, the first through hole allows water to pass through;
   a temperature sensing device, wherein the temperature sensing device is located on a surface of the shell and electrically connected to the control device, the temperature sensing device is configured to be immersed in water to detect water temperature, generate an electrical signal, and transmit the electrical signal to the control device;
   a display device, wherein the display device is located on an upper surface of the shell and electrically connected to the control device, the control device is configured to receive the electrical signal and control the display device to show temperature,
   wherein the shell comprises a floating shell and a supporting shell, the first accommodating chamber is located at an upper part of the floating shell, and a lower part of the floating shell is provided with a connecting part, the supporting shell is connected to the connecting part, and the second accommodating chamber is formed by the supporting shell and the connecting part; and
   wherein a lower part of an inner surface of the connecting part is provided with a first abutting block, and an upper part of an outer surface of the supporting shell is provided with a second abutting block, and the first abutting block abuts against the second abutting block.

2. The floating thermometer with a disinfection device according to claim 1, wherein the shell is provided with an insertion hole and a connection hole, the connection hole connects the first accommodating chamber and the insertion hole, the temperature sensing device is inserted into the insertion hole, and a power connection line passes through the connection hole.

3. The floating thermometer with a disinfection device according to claim 2, wherein an outer surface of the shell near the insertion hole is provided with an accommodating groove, and at least part of the temperature sensing device extends into the accommodating groove.

4. The floating thermometer with a disinfection device according to claim 1, further comprising an illumination device, wherein the illumination device is located within the first accommodating chamber and electrically connected to the control device, at least part of the shell is transparent or semi-transparent, and the illumination device produces light that passes through the shell.

5. The floating thermometer with a disinfection device according to claim 4, further comprising a lampshade located within the first accommodating chamber and arranged around the illumination device, wherein a surface of the lampshade is provided with a projection pattern.

6. The floating thermometer with a disinfection device according to claim 1, wherein an upper part of the inner surface of the connecting part is provided with a first slider, a sliding hole is formed on the second abutting block, and the first slider is slidably arranged in the sliding hole, such that the supporting shell is able to slide relative to the connecting part.

7. The floating thermometer with a disinfection device according to claim 1, wherein the floating shell comprises an upper floating shell and a lower floating shell, the upper floating shell is connected to and covers the lower floating shell, and the upper floating shell and the lower floating shell together form the first accommodating chamber.

8. The floating thermometer with a disinfection device according to claim 7, further comprising a sealing ring, wherein the upper floating shell is provided with a sealing groove, the sealing ring is arranged in the sealing groove, and the lower floating shell is inserted along the sealing groove and abuts against the sealing ring.

9. The floating thermometer with a disinfection device according to claim 7, further comprising a button, wherein the upper floating shell is provided with a button hole, and the button passes through the button hole and is connected to the control device.

10. The floating thermometer with a disinfection device according to claim 1, further comprising a battery, wherein the battery is located in the first accommodating chamber and electrically connected to the control device.

11. The floating thermometer with a disinfection device according to claim 10, further comprising a solar panel, wherein the solar panel is arranged on a side of the first accommodating chamber near the upper surface of the shell and electrically connected to the control device and the battery, a part of the shell corresponding to the solar panel is transparent.

12. A floating thermometer with a disinfection device, comprising:
    a shell, wherein an upper part of the shell is provided with a sealed first accommodating chamber, a control device is disposed in the first accommodating chamber, a lower part of the shell is provided with a second accommodating chamber and a first through hole connected to the second accommodating chamber, the shell is configured to float on water surface, the second accommodating chamber is configured to accommodate disinfectant substance and to be immersed in water, the first through hole allows water to pass through;
    a temperature sensing device, wherein the temperature sensing device is located on a surface of the shell and electrically connected to the control device, the temperature sensing device is configured to be immersed in water to detect water temperature, generate an electrical signal, and transmit the electrical signal to the control device;
    a display device, wherein the display device is located on an upper surface of the shell and electrically connected to the control device, the control device is configured to receive the electrical signal and control the display device to show temperature; and
    a rotating shell;
    wherein the shell comprises a floating shell and a supporting shell, the first accommodating chamber is located at an upper part of the floating shell, and a lower part of the floating shell is provided with a connecting part, the supporting shell is connected to the connecting part, and the second accommodating chamber is formed by the supporting shell and the connecting part; and wherein the rotating shell is provided with a first opening, the connecting part is provided with a second opening, the rotating shell is rotatably fitted over the connecting part and rotate between an open position and a closed position, in the open position, the first opening corresponds to the second opening: in the closed position, the first opening is offset from the second opening, and the rotating shell covers the second opening.

13. The floating thermometer with a disinfection device according to claim 12, wherein an outer surface of the rotating shell is provided with a first friction pattern.

14. A floating thermometer with a disinfection device, comprising:
- a shell, wherein an upper part of the shell is provided with a sealed first accommodating chamber, a control device is disposed in the first accommodating chamber, a lower part of the shell is provided with a second accommodating chamber and a first through hole connected to the second accommodating chamber, the shell is configured to float on water surface, the second accommodating chamber is configured to accommodate disinfectant substance and to be immersed in water, the first through hole allows water to pass through;
- a temperature sensing device, wherein the temperature sensing device is located on a surface of the shell and electrically connected to the control device, the temperature sensing device is configured to be immersed in water to detect water temperature, generate an electrical signal, and transmit the electrical signal to the control device;
- a display device, wherein the display device is located on an upper surface of the shell and electrically connected to the control device, the control device is configured to receive the electrical signal and control the display device to show temperature; and
- an adjustment shell;
- wherein the shell comprises a floating shell and a supporting shell, the first accommodating chamber is located at an upper part of the floating shell, and a lower part of the floating shell is provided with a connecting part, the supporting shell is connected to the connecting part, and the second accommodating chamber is formed by the supporting shell and the connecting part; and
- wherein the adjustment shell is provided with an adjustment hole and is rotatably mounted on the supporting shell, the adjustment shell rotates between the open position and the closed position, in the open position, the adjustment hole corresponds to the first through hole: in the closed position, the adjustment hole and the first through hole are misaligned, and the adjustment shell covers the first through hole.

15. The floating thermometer with a disinfection device according to claim 14, wherein an outer surface of the adjustment shell is provided with a second friction pattern.

16. The floating thermometer with a disinfection device according to claim 14, wherein a bottom of the supporting shell is provided with a second through hole connected to the second accommodating chamber.

17. The floating thermometer with a disinfection device according to claim 14, wherein a bottom of the supporting shell is additionally provided with an arc-shaped rotation slot, the adjustment shell is arranged with a second slider slidably arranged in the rotation slot.

18. The floating thermometer with a disinfection device according to claim 17, wherein a free end of the second slider is provided with a limit block, and the limit block abuts against an inner wall of the supporting shell.

* * * * *